L. H. OBERREICH.
AUTOMOBILE ENGINE STARTER.
APPLICATION FILED OCT. 9, 1915. RENEWED MAY 8, 1918.

1,287,085.

Patented Dec. 10, 1918.
2 SHEETS—SHEET 1.

WITNESSES:
Frank A. Fable

INVENTOR
Louie K. Oberreich,
BY
Hood & Ashby
ATTORNEYS

L. H. OBERREICH.
AUTOMOBILE ENGINE STARTER.
APPLICATION FILED OCT. 9, 1915. RENEWED MAY 8, 1918.
1,287,085.
Patented Dec. 10, 1918.
2 SHEETS—SHEET 2.
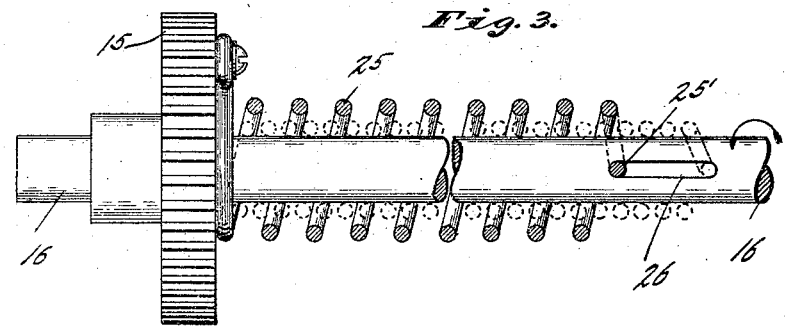
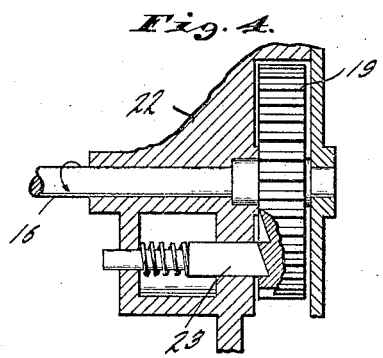
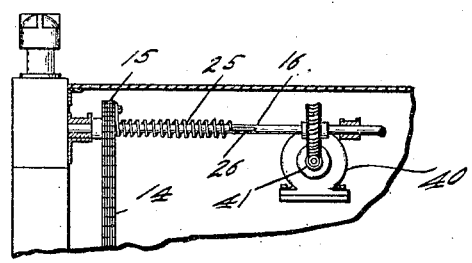
WITNESSES:
INVENTOR
Louie H. Oberreich,
BY
ATTORNEYS

UNITED STATES PATENT OFFICE.

LOUIE H. OBERREICH, OF INDIANAPOLIS, INDIANA, ASSIGNOR TO TIDEWATER EQUIPMENT CORPORATION, OF PORTLAND, MAINE, A CORPORATION OF MAINE.

AUTOMOBILE-ENGINE STARTER.

1,287,085.   Specification of Letters Patent.   Patented Dec. 10, 1918.

Application filed October 9, 1915, Serial No. 54,931. Renewed May 8, 1918. Serial No. 233,373.

*To all whom it may concern:*

Be it known that I, LOUIE H. OBERREICH, a citizen of the United States, residing at Indianapolis, in the county of Marion and State of Indiana, have invented a new and useful Automobile-Engine Starter, of which the following is a specification.

It is the object of my invention to provide a simple and inexpensive starting device for automobile engines, and one which when operated by hand can be operated from the seat with a minimum effort and without danger of a back kick.

Figure 1:
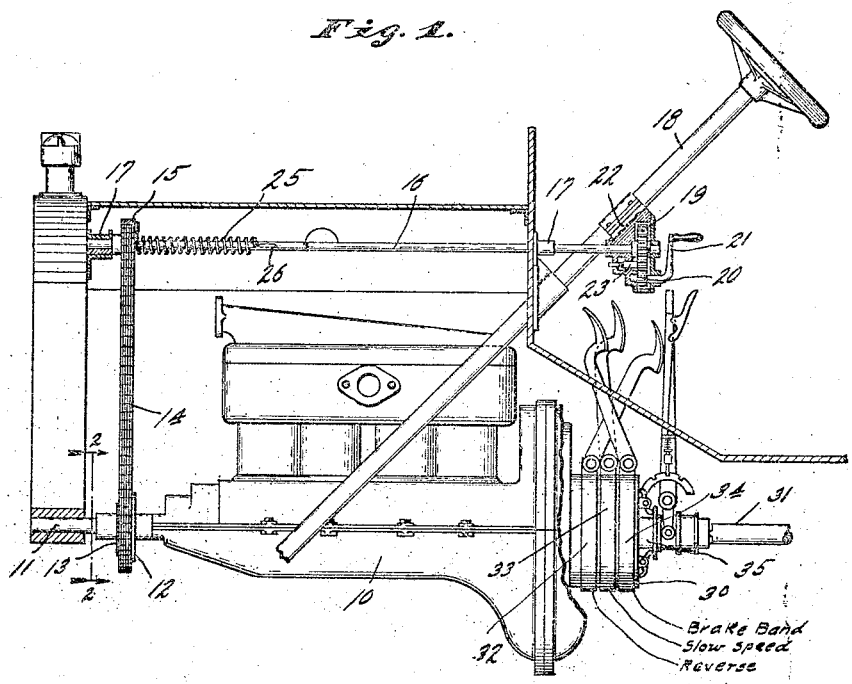
Figure 2:
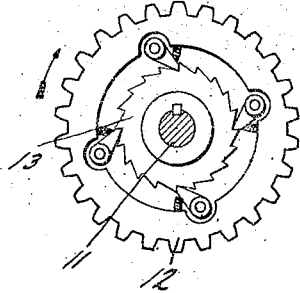

The accompanying drawing illustrates my invention. Figure 1 is a side elevation of an automobile engine and part of the transmission gear, equipped with a manually operated starter embodying my invention; Fig. 2 is a section on the line 2—2 of Fig. 1; Fig. 3 is a detail showing the torsion spring construction; Fig. 4 is a detail of the ratchet mechanism for preventing unwinding of the spring and backward movement of the operating handle; and Fig. 5 is a modification showing an electric motor drive instead of a hand operation.

The engine 10 is of any desired type of internal combustion engine, and on the forward end of its shaft 11 there is loosely mounted a sprocket 12 which is connected to the shaft 11 by a ratchet mechanism 13 of any suitable character, for transmitting power from the sprocket 12 to the shaft 11 when the sprocket rotates in the direction of the arrow but for allowing the shaft 11 to rotate in such direction without the sprocket 12. The sprocket 12 is connected by a chain 14 to a sprocket 15 loose on a shaft 16 which is carried in suitable bearings 17 and extends rearward to a point convenient to the driver, preferably just under the steering post 18. On the rear end of the shaft 16 is fixed a gear 19 which meshes with a pinion 20 rotatable by a crank 21 which can be readily grasped by the driver. The gear 19 and pinion 20 are conveniently mounted in a suitable gear box 22, which may be clamped on the steering post 18. The crank 21 is turned in a clockwise direction by the driver, as viewed by him, so that the gear 19 is thereby rotated in a counterclockwise direction, as viewed from the driver's seat.

The gear 19 and the gear box 22 are provided with any suitable ratchet mechanism 23 for preventing the gear 19 from turning in the opposite direction, as is clear from Fig. 4. A torsion spring 25, most conveniently a helical spring, surrounds the shaft 16 near its forward end, and the front end of such spring is fixed to the sprocket 15 while the rear end is attached to the shaft 16 so as to rotate therewith but to be slidable therealong. The most simple way of doing this is to provide a slot 26 in the shaft 16 and to extend the rear end 25' of the spring 25 through such slot 26. This slot 26 permits, without binding, the lengthening and shortening of the spring which is caused by its winding and unwinding. The spring 25 is made of such size relative to the shaft 16 that when wound a predetermined amount, less than the elastic limit, its concomitant contraction causes it to grip the shaft 16 closely and prevent further winding, thus connecting the sprocket 15 positively to the shaft 16.

In the arrangement shown, the rear end of the engine shaft is connected through a planetary transmission 30 to the usual transmission shaft 31 extending to the rear vehicle axle. The planetary transmission is of any desired character, and as shown includes a reverse brake disk and band 32, a slow speed brake disk and band 33, a brake disk and band 34, and a high speed clutch 35, which is a well-known standard construction. The brake band and disk 34 act to retard and stop the transmission shaft 31, and the slow and reverse speed brake bands and disks and the high speed clutch 35 act to connect the engine shaft 11 to the transmission shaft 31 in different speed relationships.

In operation, when it is desired to start the engine, the operator turns the crank 21, thereby producing rotation of the shaft 16. The friction within the engine ordinarily holds the engine from turning, so that as the shaft 16 turns the sprocket 15 remains stationary and the spring 25 is wound up until it exerts sufficient force to overcome the engine friction and turn the engine to start it. The ratchet mechanism 23 prevents the crank 21 from turning backward should the operator release it, purposely or accidentally.

Should the engine back fire and rotate its shaft 11 and therefore the sprocket 15 in the opposite direction, this merely causes a further winding up of the spring 25 and does not affect the shaft 16 or the crank 21. In case the engine friction is not sufficient to hold it until the spring 25 is sufficiently wound up, the engine shaft 11 may be connected to the transmission shaft 31, for any of the speed relationships, whether reverse, slow speed, or high speed, and the friction of the transmission and of the driving wheels of the vehicle thus added to that of the engine to restrain it. This friction may be still further increased by applying the brake 34. This permits the spring 25 to be wound as far as desired, and when the spring is sufficiently wound the connection between the shafts 11 and 31 may be broken to allow the engine shaft 11 to turn under the action of the spring 25. If for any reason, the spring 25 fails to exert sufficient force to turn the engine shaft 11, the winding of the spring may be continued until the spring firmly clasps the shaft 16, whereupon there is a direct and positive pull on the engine shaft 11 as the crank 21 is turned farther.

While I have described my invention heretofore purely as a manually operated starter, the shaft 16 may also be operated by power, such as an electric motor 40, as shown in Fig. 5. This motor 40 is connected to a shaft 16 by a worm gear 41. The motor 40 merely takes the place of the crank 21 and its connections to the shaft 16; for the spring 25 with its connection to the shaft 16 by the slot 26 and its gripping action on the shaft 16 when wound to a predetermined extent are the same as in the manually operated starter.

I claim as my invention:

1. A starter for internal combustion engines, comprising a shaft, a member loosely mounted on said shaft, a spring surrounding said shaft and having its two ends connected respectively to said shaft and to said member, that one of such parts which is connected to one end of said spring being arranged for connection to the shaft of the engine to be started, and means for turning that one of such parts which is connected to the other end of said spring, the connection between one end of said spring and its associated part permitting relative axial motion between them while requiring them to move together rotatively.

2. A starter for internal combustion engines, comprising a shaft, a member loosely mounted on said shaft, a spring surrounding said shaft and having its two ends connected respectively to said shaft and to said member, that one of such parts which is connected to one end of said spring being arranged for connection to the shaft of the engine to be started, and means for turning that one of such parts which is connected to the other end of said spring, said shaft being longitudinally slotted and the end of said spring which is connected to said shaft being connected thereto through said slot so that relative axial motion between the shaft and the spring end is permitted but the shaft and the spring end are required to move together.

3. A starter for internal combustion engines, comprising a shaft, a member loosely mounted on said shaft, a spring surrounding said shaft and having its two ends connected respectively to said shaft and to said member, that one of such parts which is connected to one end of said spring being arranged for connection to the shaft of the engine to be started, and means for turning that one of such parts which is connected to the other end of said spring, said spring being of such size relative to the shaft that when wound up to a point below its elastic limit it grips the shaft and prevents further winding of the spring and provides a positive drive between said shaft and said member.

4. A starter for internal combustion engines, comprising a spring which is stressed by winding, means for connecting one end of said spring to the shaft of said engine, means for winding said spring from the other end, said spring having its parts so arranged that when wound up to a point below its elastic limit it binds and prevents further winding of the spring and provides a positive drive between said winding means and said engine shaft.

5. An engine starter comprising a helical starting spring, winding mechanism including a rotatable element connected to one end of said spring, a rotatable element connected to the other end of said spring to transmit the starting motion from the latter, and means arranged within the convolutions of said spring to limit the contractile movement of said convolutions, said spring and said means conjointly being arranged to provide a positive driving connection between said rotatable elements when the spring is wound to the maximum degree permitted by said means.

6. An engine starter comprising a helical starting spring, winding mechanism including a rotatable element connected to one end of said spring, and transmission mechanism including a rotatable element connected to the other end of said spring, one end of said spring being movable axially toward and from the other to relieve the axial stress due to winding and unwinding.

7. An engine starter comprising a shaft, a member arranged to rotate independently of said shaft, a helical torsion spring arranged to surround said shaft, the ends of said spring being connected to said shaft and member respectively, the size of said spring relative to the size of said shaft being such that when the spring is wound to a degree less than its elastic limit it grips said shaft and prevents further winding and provides a positive driving connection between said shaft and said member.

In witness whereof, I have hereunto set my hand at Indianapolis, Indiana, this sixth day of October, A. D. one thousand nine hundred and fifteen.

LOUIE H. OBERREICH.

Copies of this patent may be obtained for five cents each, by addressing the "Commissioner of Patents, Washington, D. C."